United States Patent [19]

Sansone

[11] Patent Number: 5,890,818
[45] Date of Patent: *Apr. 6, 1999

[54] PIXEL SPLITTING TO IMPROVE BAR CODE READABILITY

[75] Inventor: Ronald P. Sansone, Weston, Conn.

[73] Assignee: Pitney Bowes Inc., Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 885,208

[22] Filed: Jun. 30, 1997

[51] Int. Cl.⁶ .................................................. G06K 19/06
[52] U.S. Cl. ........................................................ 400/103
[58] Field of Search .............................. 400/74, 103, 104

[56] References Cited

U.S. PATENT DOCUMENTS

| | | | |
|---|---|---|---|
| 4,386,272 | 5/1983 | Check et al. | 250/236 |
| 4,795,281 | 1/1989 | Ulinski | 400/103 |
| 4,810,867 | 3/1989 | Speicher | 400/103 |
| 4,847,641 | 7/1989 | Cheng-Yuan | 346/154 |
| 4,864,112 | 9/1989 | Imai | 400/104 |
| 4,960,336 | 10/1990 | Brooks | 400/103 |
| 5,056,429 | 10/1991 | Hirosaki | 400/103 |
| 5,183,343 | 2/1993 | Tazawa | 400/103 |
| 5,268,680 | 12/1993 | He | 250/566 |
| 5,438,636 | 8/1995 | Surka | 382/279 |
| 5,479,535 | 12/1995 | Komatsu | 382/199 |
| 5,510,604 | 4/1996 | England | 235/462 |
| 5,564,841 | 10/1996 | Austin | 400/103 |
| 5,676,473 | 10/1997 | Wright | 400/103 |

OTHER PUBLICATIONS

Uniform Symbology Specification PDF417, AIM USA, Pittsburgh, PA, 1994.
Ink Spread and PDF417 Readability, Kevin Hunter, Symbol Technologies, Holtsville, NY.
PDF417 Symbol Analysis for Fraud Detection, Kevin Hunter, Symbol Technologies, Holtsville, NY.
Information Encoding with Two–Dimensional Bar Codes, Theo Pavlidis et al., Symbol Technologies, Holtsville, NY.

*Primary Examiner*—Edgar Burr
*Assistant Examiner*—Charles H. Nolan, Jr.
*Attorney, Agent, or Firm*—Ronald Reichman; Melvin J. Scolnick; Robert Meyer

[57] ABSTRACT

An apparatus and method for removing fractions of a pixel from bar code bars to maintain the correct distance between adjacent correctly sized code forming bars. Thus, the distance between adjacent code forming bars will be constant and accurate. The foregoing is accomplished by varying a parameter of the beam or ink droplet that is used to produce the bar so that the bar width and space between adjacent code forming bars will be accurately maintained. Hence, bars of a bar code will be accurately reproduced to enable the bar code to be accurately read.

20 Claims, 15 Drawing Sheets

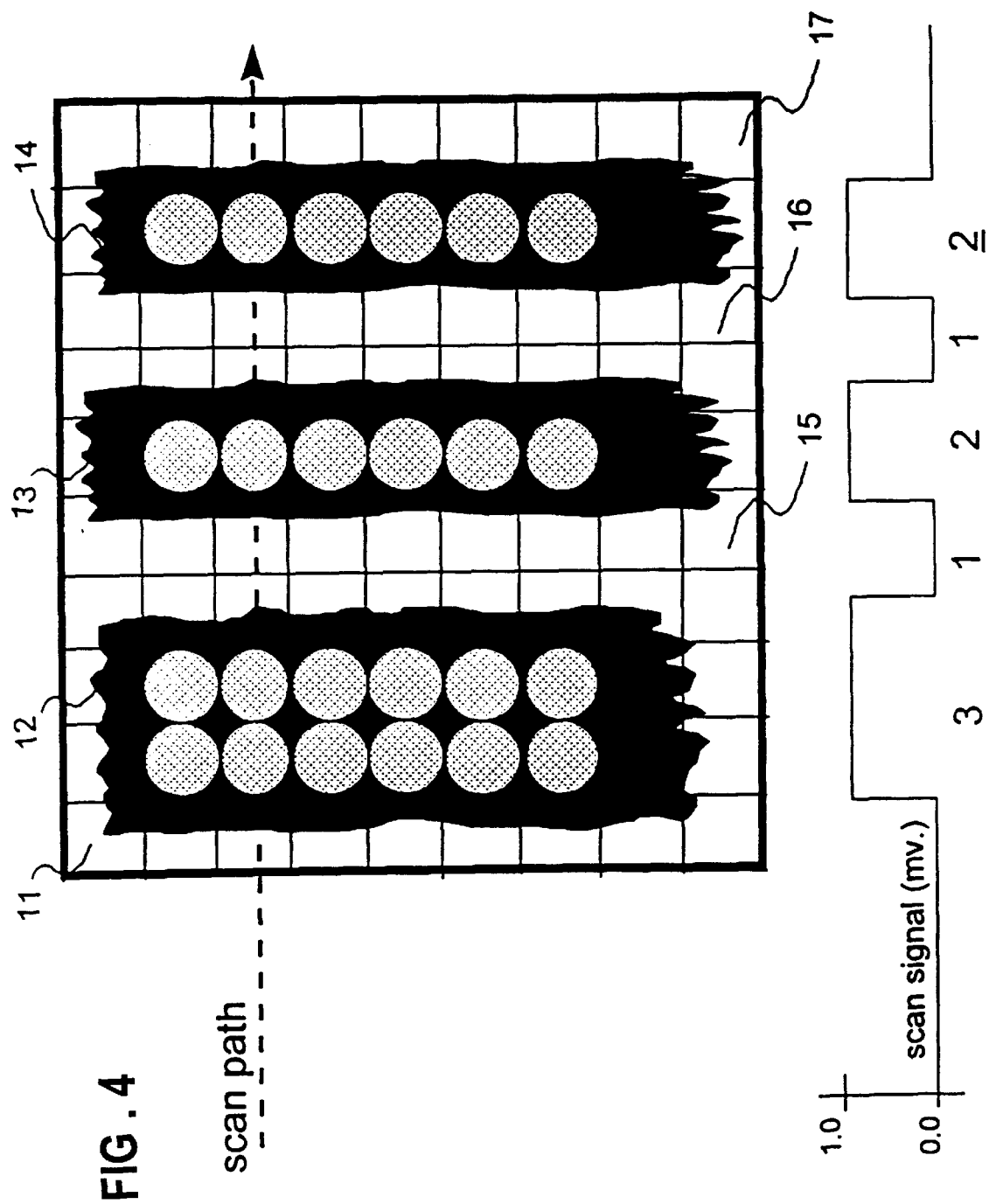

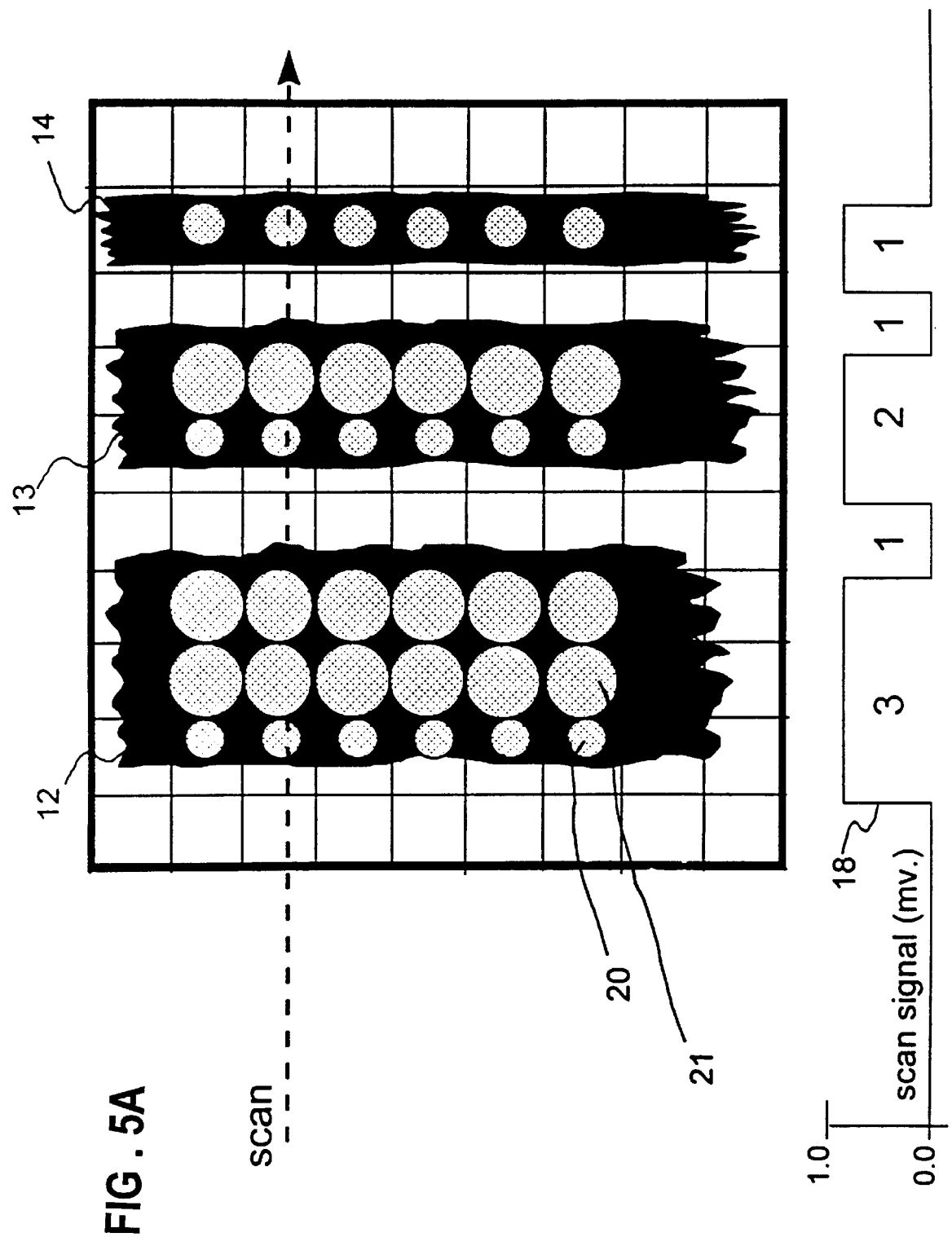

FIG. 12

MAILER COMPUTER
- PSD based "MAILER" Program (or a program that prints barcodes) — 30A
- Bar Code Print Quality Manager Program — 100
- Barcode Quality Factors Data Base — 300
- BCPQ Variable Spot "software" RIP Driver — 320

PSD — 40
MODEM — 44
41
MAILER PRINTER — 42
- variable spot size printing
- RIP bypass port
- or
- soft-RIP compatible

PIXEL SPLITTING TO IMPROVE BAR CODE READABILITY

FIELD OF THE INVENTION

The invention relates generally to the field of encoding marks and more particularly to bar codes.

BACKGROUND OF THE INVENTION

Bar codes have been used in a wide variety of applications as a source for information. Typically bar codes are used at a point-of-sale terminal in merchandising for pricing and inventory control. Bar codes are also used in controlling personnel access systems, mailing systems, and in manufacturing for work-in process and inventory control systems, etc. The bar codes themselves represent alphanumeric characters by series of adjacent stripes of various widths, i.e. the universal product code.

A bar code is a set of binary numbers. It typically consists of black bars and white spaces. A wide black bar space may signify a one and a thin black bar or space may signify a zero. The binary numbers stand for decimal numbers or letters. There are several different kinds of bar codes. In each one, a number, letter or other character is formed by a pre-established number of bars and spaces.

Bar code reading systems or scanners have been developed to read bar codes. The bar code may be read by having a light beam translated across the bar code and a portion of the light illuminating the bar code is reflected and collected by a scanner. The intensity of the reflected light is proportional to the reflectance of the area illuminated by the light beam. This light is converted into an electric current signal and then the signal is decoded. Bar codes are read by taking the ratio of the bars width to the width of the adjacent spaces.

Bar codes may be placed on objects with many different types of technology i.e., ink jet printing, laser or LED-based xerography, etc. When bars are recorded on objects with ink jet printers or by LED-based xerographic techniques, the bars will be reproduced differently. The bars have a tendency to grow in width. Consequently, the spaces between adjacent code forming bars become smaller and the code becomes more difficult to read. The prior art has attempted to solve the foregoing problem by incorporating a time compensating set of bars in the body of the bar code. The time compensating bars were used to compute the printer induced growth of the bars and then to compensate for bar growth.

The prior art also utilized pixel shaving techniques to compensate for increases in the size of bar code bars. Pixel shaving techniques were only able to partially compensate for correct increases in the size of bar code bars. The reason for the above is that only complete pixels were removed or added to adjacent code forming bars. Thus, the space between adjacent code forming bars would still not be constant.

Historically postage meters have been mechanical and electromechanical devices that: maintain through mechanical or "electronic registers" (postal security devices) an account of all postage printed and the remaining balance of prepaid postage; and print postage postmarks (indicia) that are accepted by the postal service as evidence of the prepayment of postage.

Soon small business mailers may be able to use their desktop computer and printer to apply postage directly onto envelopes or labels while applying a address. The United States Postal Service Engineering Center recently published a notice of proposed specification that may accomplish the foregoing. The title of the specification is Information Based Indicia Program Postal Security Device Specification, dated Jun. 13, 1996. The Information Based Indicia Program specification includes both proposed specifications for the new indicium and proposed specifications for a postal security device (PSD). The proposed Information - Based Indicia (IBI) consists of a two dimensional bar code containing hundreds of bytes of information about the mail piece and certain human-readable information. The indicium includes a digital signature to preclude the forgery of indicia by unauthorized parties. The postal security device is a unique security device that provides a cryptographic digital signature to the indicium and performs the function of postage meter registers.

Recent studies have shown that the code format tolerances promulgated in the IBIP specification can only be met by some of the available printers. Both resolution (dots/inch) and positional accuracy seem to be the major limiting factors. Furthermore, the printing technology used is yet another major factor, specifically when combined with the type of paper used to form the envelope. Current estimates suggest that 2–3% of the IBIP indicium that are affixed to mail pieces will not be able to be read due to the use of incorrect printers, defective printers or improper envelopes.

Two dimensional bar codes and many other types of codes do not have an element that allows for the increase in width of bar code bars caused by reproducing the bars on objects.

SUMMARY OF THE INVENTION

This invention overcomes the disadvantages of the prior art by providing a apparatus that removes fractions of a pixel from bar code bars to maintain the correct distance between adjacent code forming bars. Thus, the distance between adjacent code forming bars will be constant and accurate. The foregoing is accomplished by varying a parameter of the beam or ink droplet that is used to produce the bar so that the bar width and space between adjacent code forming bars will be accurately maintained. Hence, bars of a bar code will be accurately reproduced to enable the bar code to be accurately read.

This invention utilizes the fact that smaller than full pixel size spots may be printed and located at the edges of the code bars of the bar code, so as to maintain the correct distance between adjacent code forming bars. For laser and LED printers the intensity of the beam or the exposure time may be varied in order to print various (pixel) spot sizes. In ink jet printing the stimulation voltage or pulse width may be varied in order to print various (pixel) spot sizes. Furthermore, the firing time of the "spot" print device can be delayed or advanced to pack the droplets in a denser fashion (as needed). One or more print parameters may be varied to accomplish the enhancement of bar code readability.

BRIEF DESCRIPTION OF THE DRAWINGS

FIG. 4 is a drawing of prior art raster printed code bars of bar code 11 of FIG. 1 showing digital shaving correction to correct for bar growth caused is by the printing process;

FIG. 5A is a drawing showing the bar code of FIG. 4 corrected by varying the spot size;

FIG. 12 is a drawing showing the interaction of printer 42 with the programs contained in computer 41;

DETAILED DESCRIPTION OF THE PREFERRED EMBODIMENT

Figure 1:
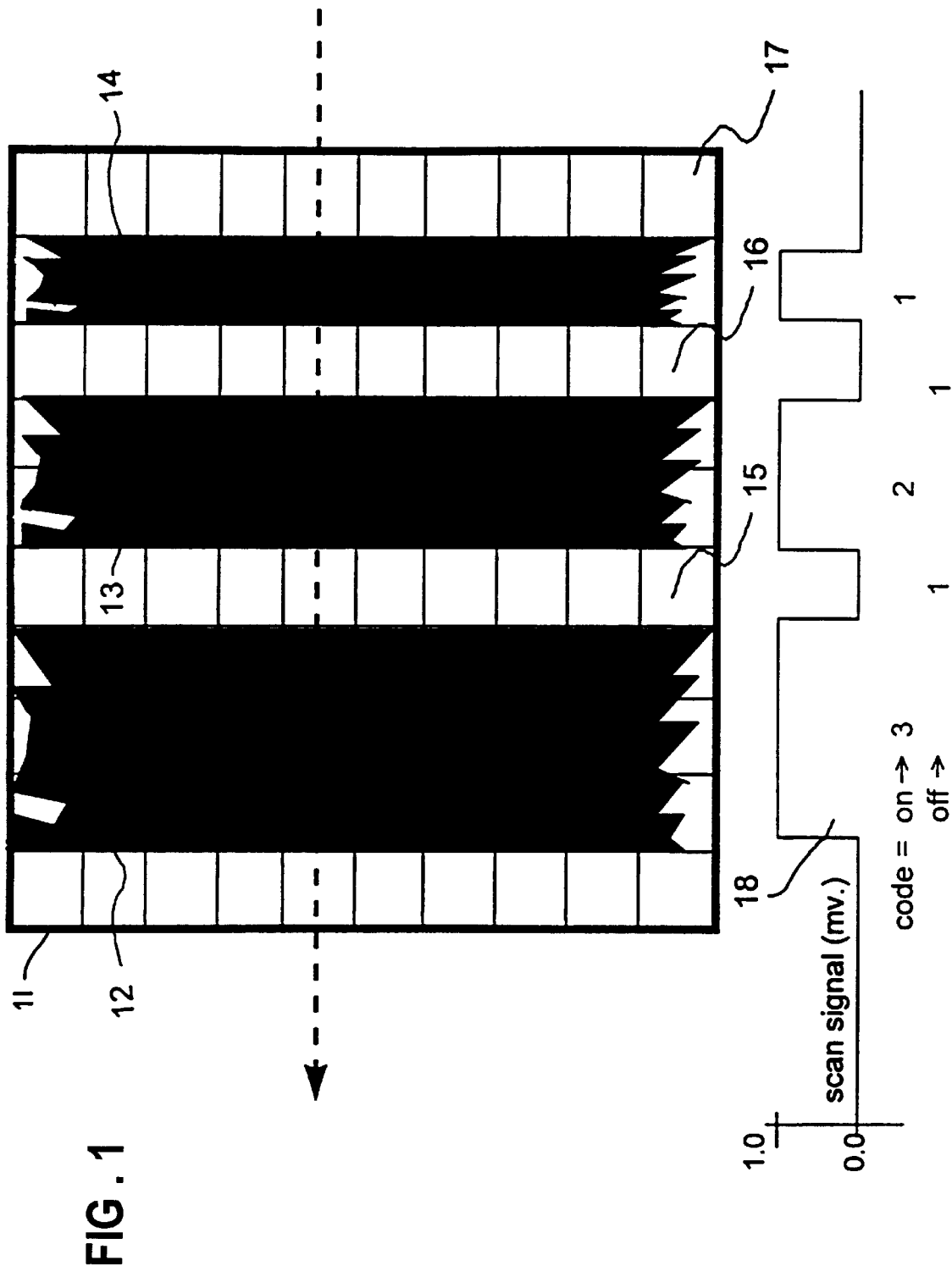
FIG. 1 is a drawing of ideal code bars of a bar code.

Referring now to the drawings in detail, and more particularly to FIG. 1, the reference character 11 represents an ideal bar code. Bar code 11 contains bars 12, 13 and 14 and spaces 15, 16 and 17. Bar 12 is three pixels wide and bar 13 is two pixels wide. Bar 14 is one pixel wide. Bar 12 is three units wide and represents a unique number, i.e., three and bar 13 is two units wide and represents a unique number i.e., two. Bar 14 is one unit wide and represents a unique number i.e., one. Spaces 15, 16 and 17 are one unit wide.

Scan signal 18 represents the signal that will be produced by scanning bars 12, 13 and 14 and spaces 15, 16 and 17. Signal 18 may be produced by a spot of light one pixel or less in diameter, where a pixel is equivalent to one bar width unit. The light from the moving spot is scattered over the code surface and is collected by a suitable detector producing a signal similar to signal 18. Signal 18 is between 0 and 1.0 millivolts. Signal 18 is 1 mV while the light spot is transitioning bars 12, 13 and 14 and 0 millivolts when the light spot is transitioning spaces 15, 16 and 17.

The coded information represented by code 11 is contained in the relative width of the bars and spaces in scanned signal 18. Assuming the code is the ratio of the signal from a bar divided by the signal of the next adjacent space. Then, the value of bar 12 is 3 divided by 1 or 3 and the value of bar 13 is 2 divided by 1 or 2. The value of bar 14 would be 1 divided by 1 or 1. Thus, scanned signal 18 may be decoded as 3, 2, 1.

Figure 2:
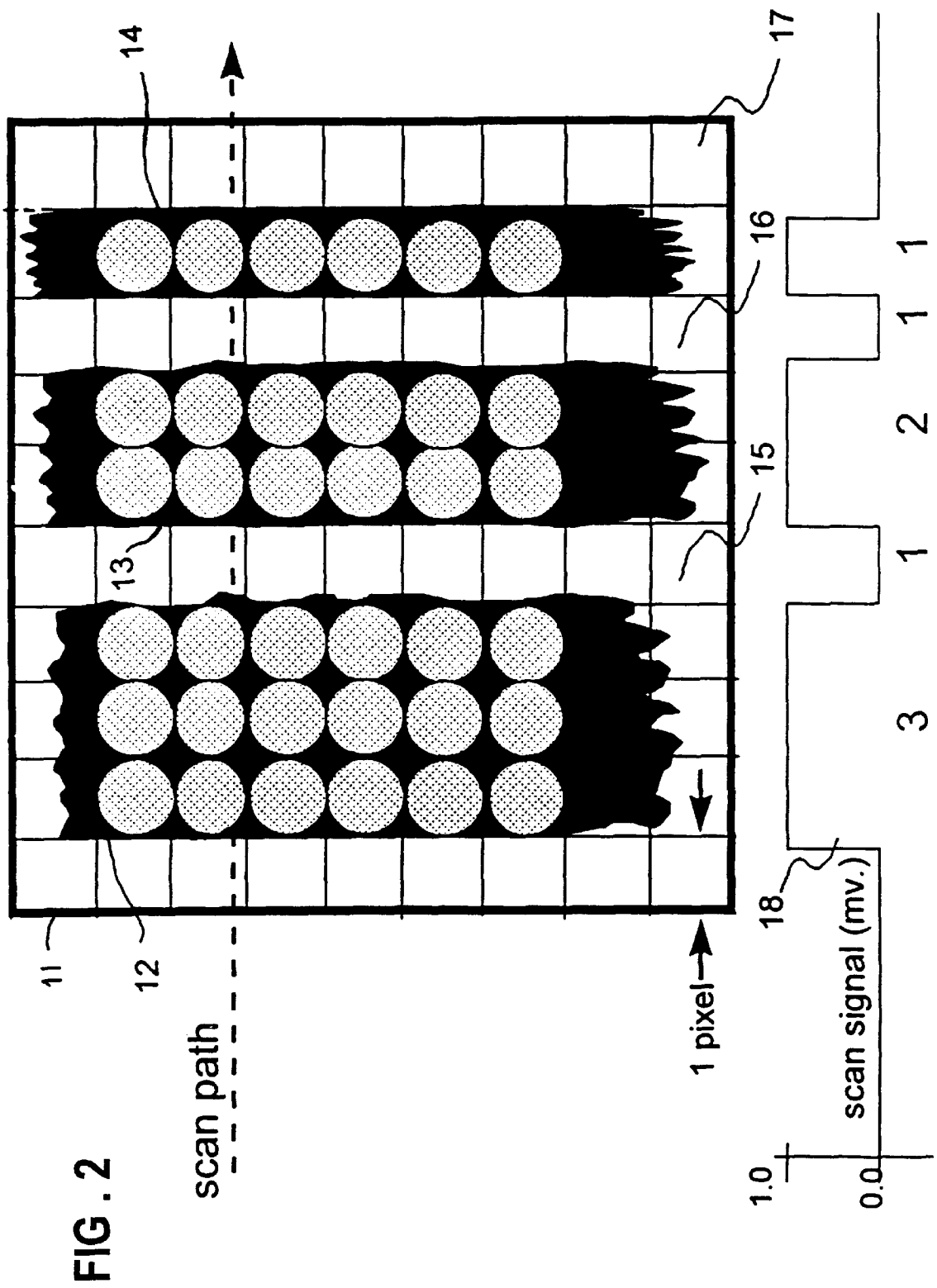
FIG. 2 is a drawing of ideal raster printed code bars of bar code 11 of FIG. 1.

FIG. 2 is a drawing of ideal raster printed code bars of bar code 11 of FIG. 1. Virtually no growth was introduced into bars 12, 13 and 14 by the printing process and virtually no shrinkage was introduced into spaces 15, 16 and 17 by the printing process. Thus, the value of bar 12 is 3 divided by 1 or 3 and the value of bar 13 is 2 divided by 1 or 2. The value of bar 14 would be 1 divided by 1 or 1. Hence, scanned signal 18 may be decoded as 3, 2, 1.

Figure 3:
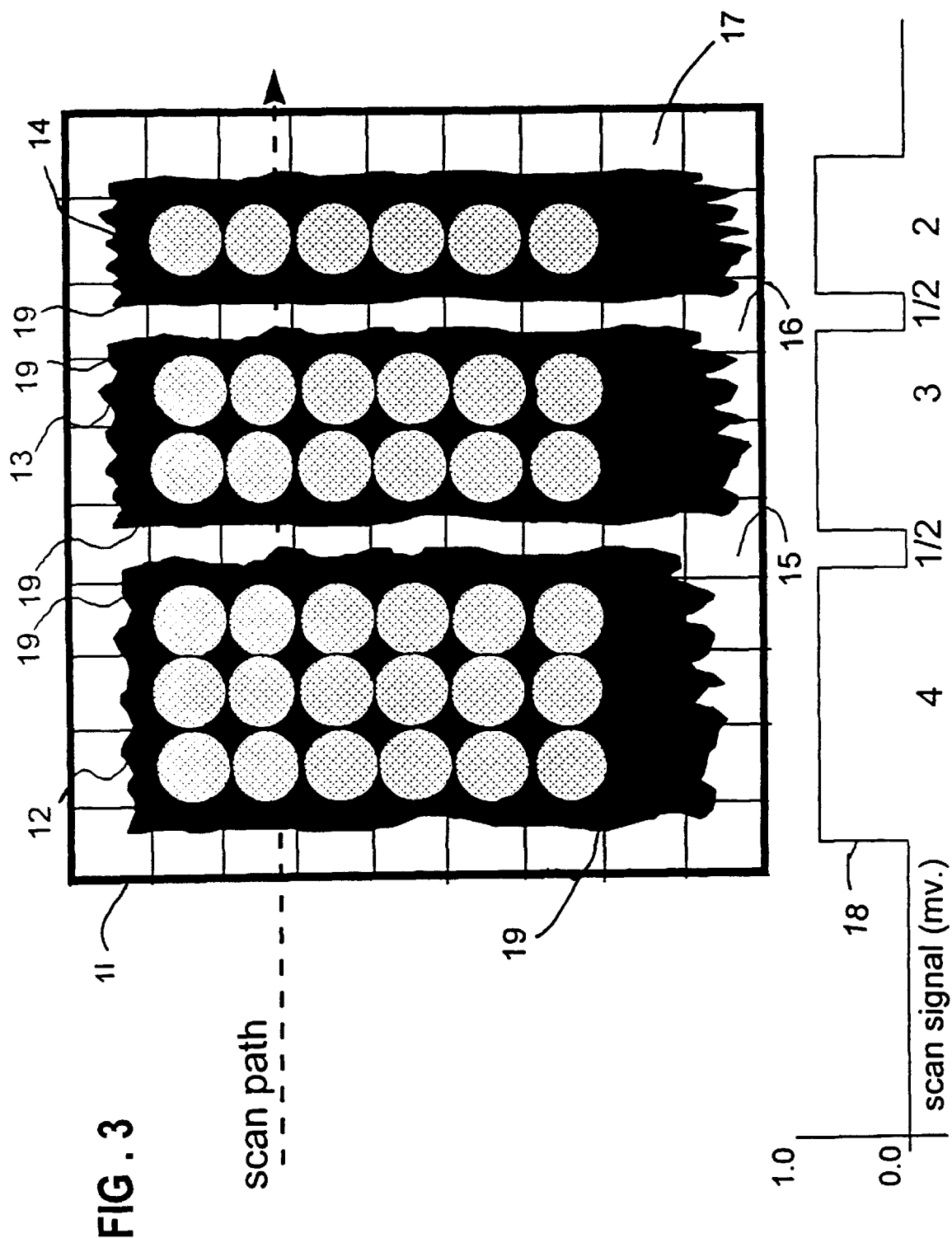
FIG. 3 is a drawing of prior art raster printed code bars of bar code 11 of FIG. 1 showing growth of the bars caused by the printing process.

FIG. 3 is a drawing of prior art raster printed code bars of bar code 11 of FIG. 1, showing growth of the bars introduced by the printing process. Symmetrical growth 19 appears along the vertical edges of bars 12, 13 and 14, due to development process parameters or toner particle size introduced by the printing process. An ink jet printer (not shown) may cause growth 19 by wicking of the printing paper. The amount of wicking is dependent on the properties of the printing ink and paper. Wetting of the printing paper may also be responsible for growth 19. Thus, the value of bar 12 is 4 divided by 0.5 or 8 and the value of bar 13 is 3 divided by 0.5 or 1.5. The value of bar 14 would be 2 divided by 0.5 or 4. Hence, scanned signal 18 would be decoded as 8,1.5,4.

FIG. 4 is a drawing of prior art raster printed code bars of bar code 11 of FIG. 1 showing digital shaving correction to correct for bar growth caused by the printing process. Digital shaving is the selective removal of an entire row of pixels from the vertical edges of bars 12, 13 and 14 to compensate for growth 19 of the printed image. A neighborhood like process is used to straighten or sharpen the vertical edges of bars 12, 13 and 14. Thus, the value of bar 12 is 3 divided by 1 or 3 and the value of bar 13 is 2 divided by 1 or 2. The value of bar 14 would be 2 divided by 1 or 2. Hence, scanned signal 18 may be decoded as 3, 2, 2.

FIG. 5A is a drawing showing the bar code of FIG. 4 corrected by this invention. A selected spot size at the selected vertical edges of bars 12, 13, and 14 are used to correct for bar growth caused by the printing process. Selective different spot sizes are used to make sure the width of the bars is their intended width. Spot 20 is one half the width of spot 21. Spot 21 is normally used or is the nominally width to represent one unit. A row of pixels from FIG. 4 have been reduced in size to obtain the correct bar width. Thus, the value of bar 12 is 3 divided by 1 or 3 and the value of bar 13 is 2 divided by 1 or 2. The value of bar 14 would be 1 divided by 1 or 1. Hence, scanned signal 18 may be decoded as 3, 2, 1.

Figure 5B:
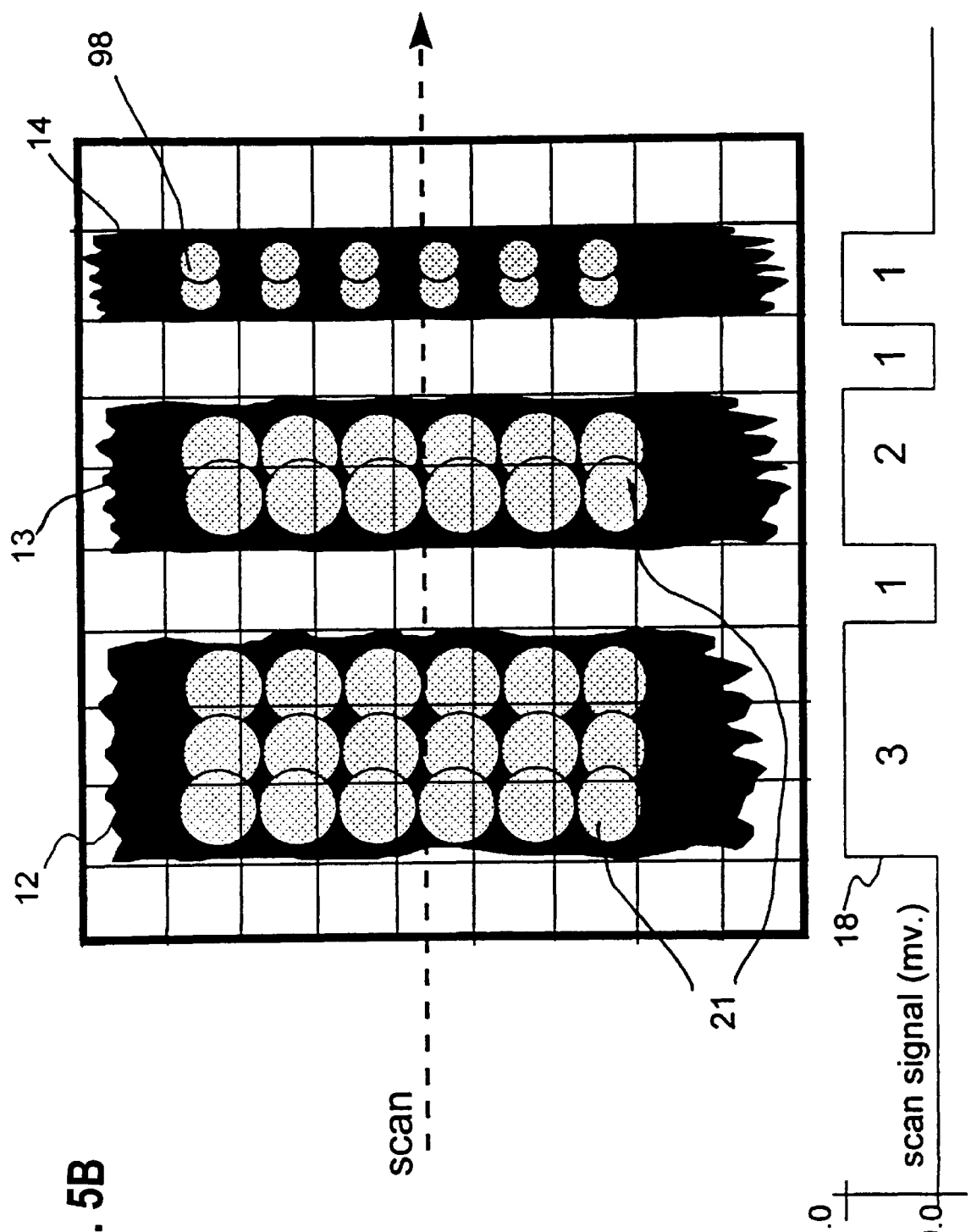
FIG. 5B is a drawing showing the bar code of FIG. 4 corrected by advancing or delaying the print position of spots so as to product bars of the correct width.

FIG. 5B is a drawing showing the bar code of FIG. 4 corrected by advancing or delaying the print position of spots so as to produce bars 12, 13 and 14 of the correct width. A spot size for each column of pixels cells that makes up a bar is selected. For example, bar 12 comprises three columns of pixel cells; bar 13 comprises two columns of pixel cells and bar 14 comprises two columns of pixel cells. Bar 12 was printed by overlapping the right hand and the left hand column of spots 21 with the central column of spots 21. The foregoing was accomplished by delaying the printing of the left hand column of spots 21 and advancing the right hand column of spots 21. Bar 13 was printed by overlapping the left hand columns of spots 21. Bar 14 was printed by overlapping the printing of spots 98. Spots 98 are a difference size than spots 21.

Figure 6:
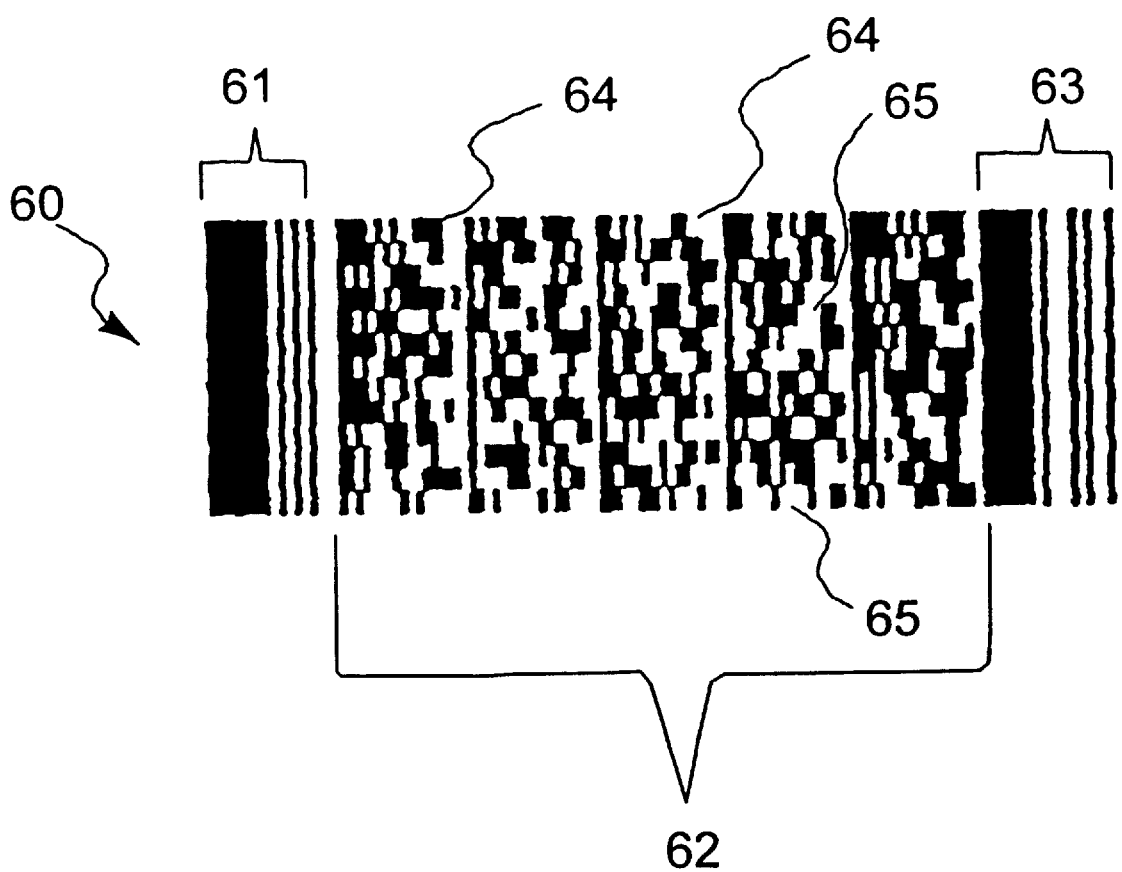
FIG. 6 is a drawing of a two dimensional (2-d) bar code.

FIG. 6 is a drawing of a two dimensional (2-d) bar code 60. Bar code 60 includes: a start pattern 61, that informs a scanner (not shown) when to begin reading data; a data portion 62; and a stop pattern 63, that informs a scanner when to stop reading data. Data portion 62 comprises rectangles 64 and spaces 65. The coded information represented by data portion 62 is contained in the relative size of the rectangles 64 and spaces 65 that are scanned.

Bar code 60 is produced by the same procedure that was used to produce the one dimensional bar codes described in FIGS. 1–5. Symmetrical growth (not shown) along the vertical and horizontal sides of rectangles 64 would appear for the reasons previously mentioned. The growth of rectangles 64 and the shrinkage of spaces 65 may change the value of specific rectangles 64. Selective different spot sizes at the vertical and horizontal sides of rectangles 64 are used to correct for rectangle growth caused by the printing process. Selective different spot sizes are used to make sure the size of the rectangles is their intended size.

Figure 7:
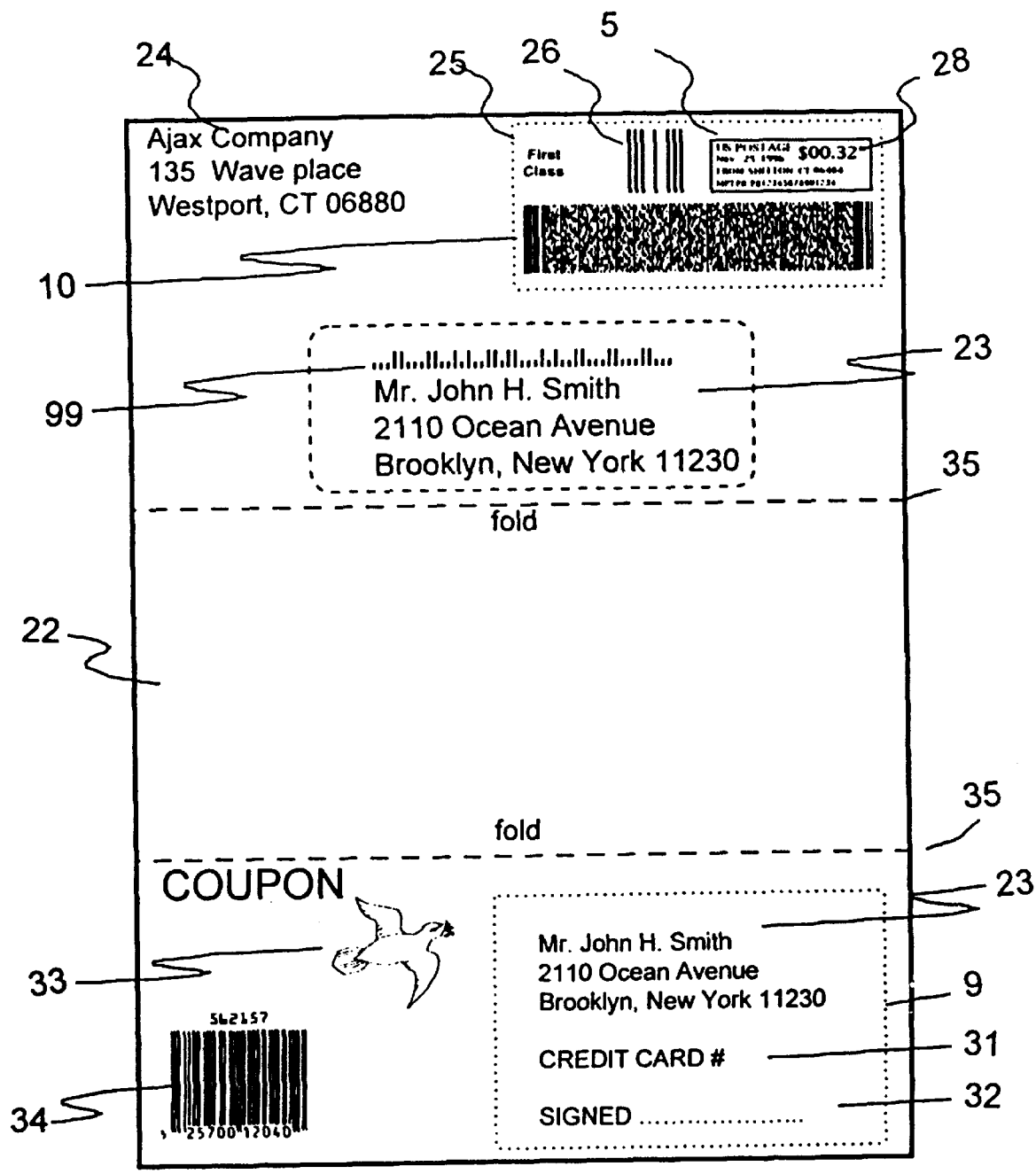
FIG. 7 is a drawing of a folded mail piece.

FIG. 7 is a drawing of a folded mail piece. Mail piece 22 has a recipient address field 23 and a sender address field 24.

A postal indicia 25 is affixed to mail piece 22. Indicia 25 contains a FIM bar code 26; a 2d bar code 27; postal information 28; and the class of mail 29. Recipient address field 23 includes a bar code 99. A coupon 30 is included in mail piece 22. Coupon 30 includes recipient address field 23, a space 31 for the recipients credit card information, a space 32 for the recipients signature; logo 33 and bar code 34. Mail piece 22 may be folded along lines 35. It would be obvious to one skilled in the art that the information contained in mail piece 22 may be recorded on an envelope and recorded in a medium that is inserted into the envelope.

Figure 8:
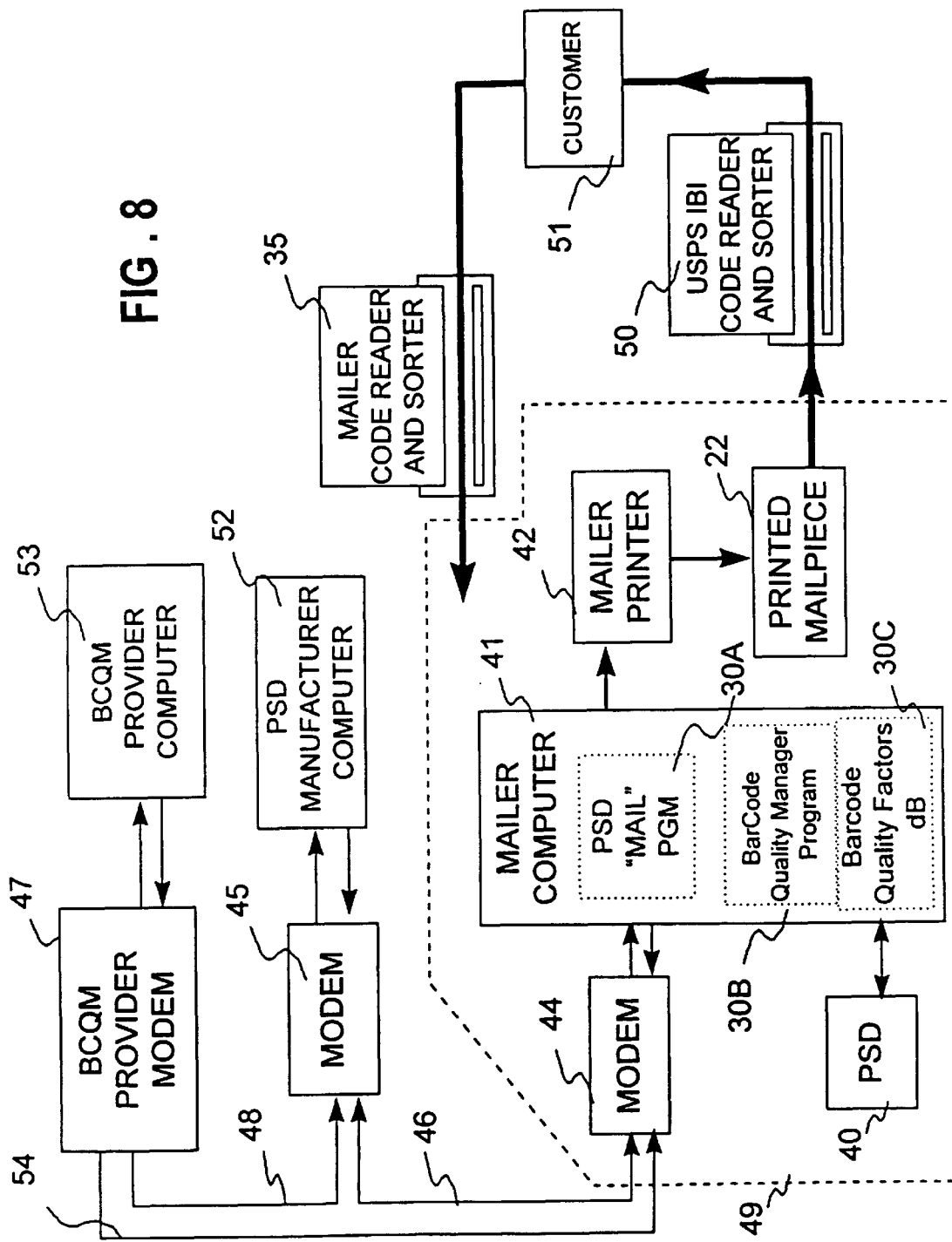
FIG. 8 is a block drawing of the system used to remove fractions of a pixel from bar code bars.

FIG. 8 is a block drawing of the system used to remove fractions of a pixel from bar code bars to maintain the correct distance between adjacent code forming bars. Postal security device (PSD) 40 is coupled to user computer 41 and computer 41 is coupled to printer 42. Computer 41 contains a PSD mail program, which may be the Dazzle Envelope Manager Software Program manufactured by Dazzle of 247 High Street, Palo Alto, Calif. 94301-1041, a bar code quality manager program, which is more fully described in the description of FIGS. 9 and 10 and a bar code quality data base which is more fully described in the description of FIG. 11. Printer 42 is capable of printing a mail piece 22 containing bar codes 26, 271 29 and 34 affixed thereto (described in the description of FIG. 7). Printer 42 is also capable of printing other bar codes on mail piece 22 and printing bar codes on material that may be inserted into an envelope (not shown). Modem 44 is coupled to computer 41 and modem 45 via communications path 46. Modem 44 is coupled to modem 47 via communications path 48.

Modem 44, computer 411 PSD 40, user printer 42 and mail piece 22 may be found in the office of mailer 49. Mailer 49 will deposit mail piece 22 in the mail. Mail piece 22 will be read by USPS Information-Based Indicia code reader and sorter 50. Then, mail piece 22 will be delivered to customer 51 by the United States Postal Service. Modem 45 is coupled to PSD manufacturing computer 52. Modem 45 and computer 52 may be found at a site of the manufacturer of PSD 40. Modem 47 is coupled to bar code quality manager computer 53. Modem 47 is coupled to modem 44 via communications path 54. Modem 47 and computer 53 may be found at a site of the manufacturer of the bar code quality manager program.

Computer 41 may receive information from computer 53 about the bar code quality manager program from the manufacturer of the bar code quality manager program via modems 47 and 44. The above information may also be contained in a diskette or other memory storage device and then entered into the memory of computer 41.

Computer 41 stores in its memory information about the printers, printer settings, inks or toners and papers that have been found to be compatible with the printing of indicia 43. Computer 41 transmits the aforementioned information to modem 44. Modem 44 transmits the above information to modem 45 and modem 45 transmits the aforementioned information to computer 52. A specification for a PSD is set forth in the USPS Information Based Indicia Program Postal Security Device Specification, dated Jun. 13, 1996, herein incorporated by reference. Computer 41 may receive information about the printers, printer settings, inks or toners and papers that have been approved by the USPS for the printing of indicia 43 from the manufacturer of postal security device 40 via modems 45 and 44. The above information may also be contained in a diskette or other memory storage device and then entered into the memory of computer 41.

Figure 9:
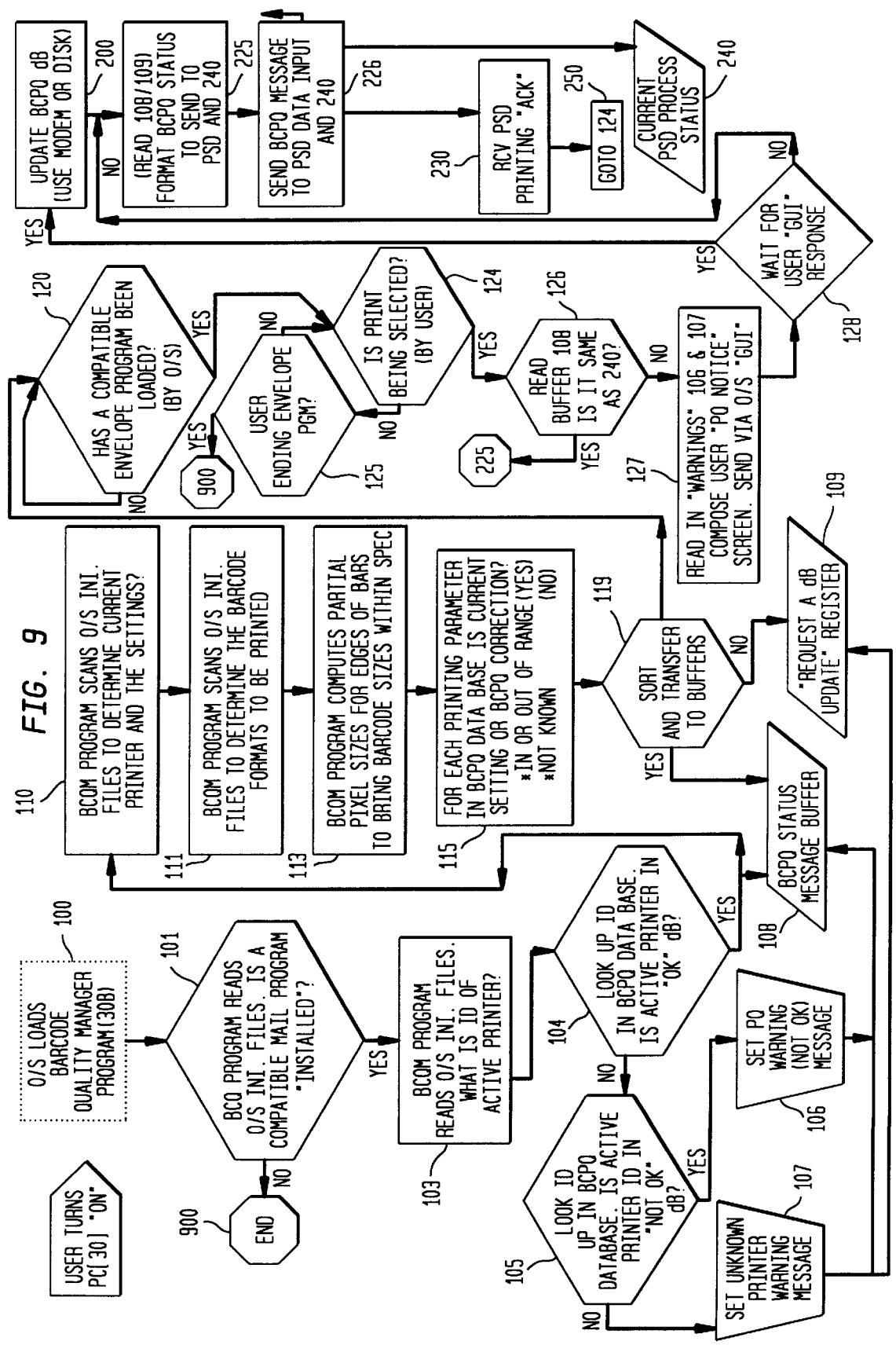
FIG. 9 is a drawing of a flow chart of the bar code print quality manager program contained in user computer 41.

The operator of computer 41 will use the program described in the description of FIG. 9 to enter the printer, printer type, configuration setting information, paper, ink, or toner combination that is going to be used to print indicia 43 and the desired bar code.

FIG. 9 is a drawing of a flow chart of the bar code quality manager program contained in user computer 41. The user turns computer 41 on and in block 100 the operating system of computer 41 loads the bar code quality manager program into the memory of computer 41. Then the program goes to block 101 where the program determines whether or not a compatible mail piece program is installed in the memory of computer 41. A compatible envelope program may be the Dazzle Envelope Manager Software program manufactured by Dazzle of 247 High Street, Palo Alto, Calif. 94301-1041. If, a compatible mail piece program is not installed in the memory of computer 41, the program would proceed to block 900 and end. If, a compatible mail piece program was installed in the memory of computer 41 the program would advance to block 103 and the program would read the operating system Initiating files and determine what is the identification of active user printer 42 (FIG. 8). Then the program would precede to decision block 104 and determine whether or not the identification of the bar code print quality data base of printer 42 is listed in the data base as a approved printer. If, the answer to the aforementioned question is no, the program would go to decision block 105.

In decision block 105 the program would determine whether or not active printer 42 is listed in the data base as a printer that is not an approved printer. If, it was determine that printer 42 was listed as a printer that was not approved, then the program would go to block 106 and set a warning message that printer 42 is not the correct printer. Then the program would send the above message to bar code print quality status message buffer in block 108. If, decision block 105 determined that the answer was no, the program would advance to block 107. Block 107 would compose a warning message indicating that it does not know if printer 42 is an approved printer. The aforementioned warning message composed in block 107 will be sent to block 109 to request a data base update. Block 109 would be a buffer that would request an update on the status of printer 42. If, decision block 104 had a positive answer, this fact would be stored in bar code print quality status message buffer 108.

At this point the program would advance to block 110 where the program would scan the operating systems Initiating files to determine what is the current printer and its settings i.e., dither setting, graphic setting, resolution enhancement technology setting (if valid), paper identification, toner identification and/or ink identification of printer 42. Then the program would go to block 111 and scan the operating systems initiating files to determine the bar code formats to be printed. Now, the program would go to block 113 to compute the partial pixel sizes for edges of bars to bring the bar code sizes within specified tolerances. The operation of block 113 is more fully described in the description of FIG. 9.

Now the program would advance to block 115. In block 115 the program will look at each printing parameter in the bar code print quality data base and see if the current setting or the bar code print quality correction is in or out of the specified range or is not known.

At this point the program would go to decision block 119, where the program would sort and transfer the information received from block 115 to the proper buffers. If, the information was not known, this fact would be stored in block 109 request update buffer. If, the settings were in and out of the approved ranges the program would go to block 108 bar code print quality message status buffer where this fact would be stored. If, the settings were within the approved ranges the program would go to decision block 120. Decision block 120 would determine whether or not a compatible envelope program is being loaded. If, a compatible envelope program is not being loaded the program would go back to the input of block 120 and wait until a compatible envelope program is loaded. If, a compatible envelope program is being loaded, then the program would advance to block 124 to determine whether or not the user of computer 42 selected the print command. If, block 124 determines that the print command was not selected the program would go to decision block 125. Decision block 125 would determine whether or not the envelope program is going to be terminated by the user of computer 42. If, the envelope program is not going to be terminated then the program will go back to block 124. If, the envelope program is going to be terminated then the program will go to block 900 and the program will end. If, block 124 determines that the print command was selected the program would go to block 126 to read the contents of buffer 108 and determine whether or not it is the same as the contents of block 240. If, block 126 determines that the information in block 108 is the same as the information in block 240, the program would go to block 240. If, block 126 determines that the information in block 108 is different from the information in block 240, the program would go to block 127. Block 127 would use the warning information that was read from blocks 106 and 107 and compose a user print quality notice that will appear on the display of computer 42.

At this juncture the program would advance to decision block 128 where the program would wait for the users response to the warnings. If, decision block 128 determines that the user of computer 42 wants to follow the warning message and/or messages the program would advance to block 200 where a request to update the bar code print quality data base may be made via modem 28 (FIG. 8) or diskette (not shown). If, decision block 128 determines that the user of computer 42 does not want to follow the warning message and/or messages the program would advance to block 225 where the program would read the information contained in buffer 108 and buffer 109 and format a bar code print quality status message. Then the program will go to block 226 where the aforementioned bar code print quality message will be sent to the data input of PSD 40 (FIG. 8). and block 240 where the current process is stored in buffer memory.

Now the program will go to block 230 where PSD 40 will acknowledge receipt of the aforementioned message. Then the program will go to block 250 then go back to block 124.

Figure 10:
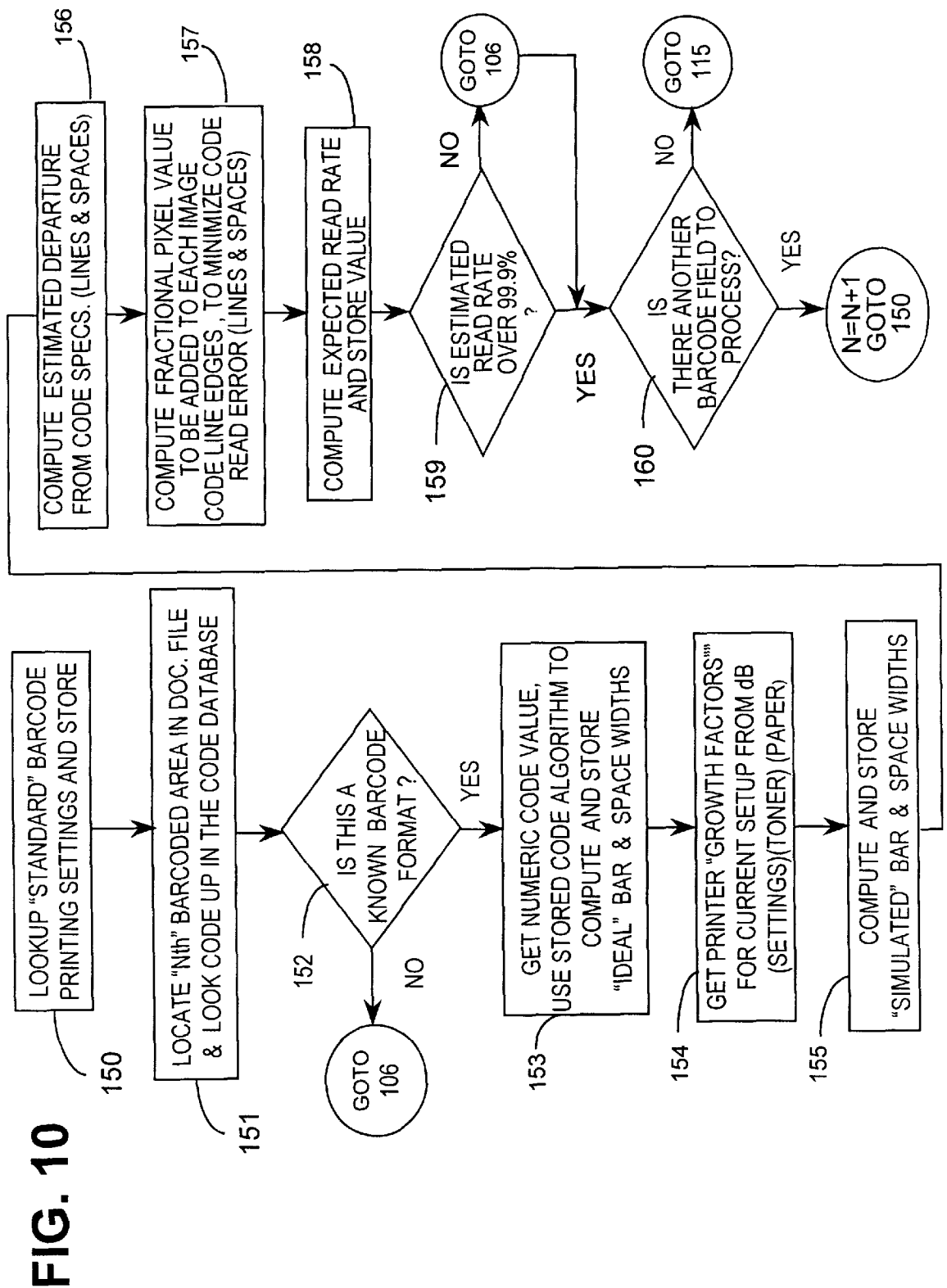
FIG. 10 is a drawing of a flow chart of block 113 of FIG. 9.

FIG. 10 is a drawing of a flow chart of block 113 of FIG. 9. This subroutine begins in block 150 where the program looks up and stores the standard bar code printing settings. Block 150 also sets N=N+1, where N equals the number of bar codes used. Now the program goes to block 151 to locate the Nth bar code area in the document file and looks up the bar code in the bar code data base. Then the program goes to decision block 152. If, decision block 152 determines that the looked up bar code is a unknown bar code format the program would go to block 106.

Figure 11:
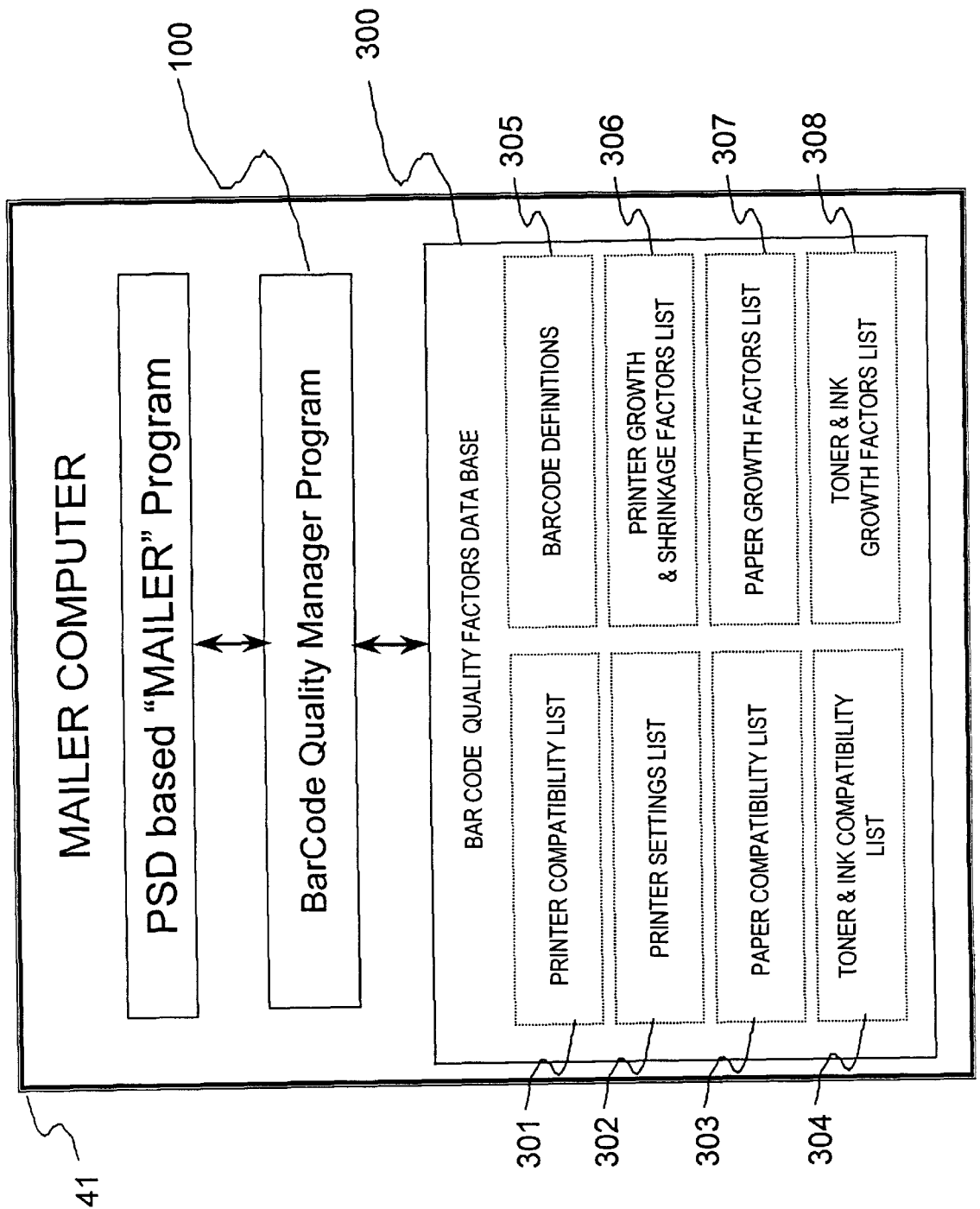
FIG. 11 is a drawing showing the interaction between the PSD based mailer program, the bar code quality manager program and the bar code quality factors data base.

If, decision block 152 determines that the looked up bar code is a known bar code format the program would go to block 153. Block 153 would obtain the numeric code value and use the stored code algorithm to compute and store "ideal" bar and space widths. An example of a bar code algorithm is contained in the "Uniform Symbology Specification PDF417" published in 1994 by AIM Inc. 634 Alpha Drive, Pittsburgh, Pa. 15238-2802, herein incorporated by reference. Then the program would go to block 154 to obtain the printer "growth factors" for the current printer 42 setup i.e., settings, toner, paper, etc. from the data base (FIG. 11). Now, the program would go to block 155 to compute and store "simulated" bar and space widths. Then the program will go to block 156 to compute the estimated departure of the lines and spaces from the specification of the bar code. At this point the program goes to block 157 to compute the fractional pixel value to be added to each image code line edge to minimize the bar code read error of the lines and spaces. Then the program goes to block 158 to compute the expected read rate and store this value. Now the program goes to decision block 159 to determine whether or not the estimated read rate of the bar code is over 99.9%. If, decision block 159 determines that the read rate is less than 99.9% then the program would go to block 106 (FIG. 9). If, decision block 159 determines that the read rate is greater than or equal to 99.9% the program would go to decision block 160. Decision block 160 determines whether or not there is another bar code field to be processed. If, decision block 159 determines that there is no other bar code field to be processed the program would go to block 115 (FIG. 9). If, block 159 determines that there is another bar code field to be processed, the program would go to block 150 after setting N=N+1, where N equals the number of bar code areas used.

FIG. 11 is a drawing showing the interaction between the PSD based mailer program, the bar code quality manager program and the bar code quality factors data base. The aforementioned programs are contained in computer 41, described in the description of FIG. 8. The PSD mailer program exchanges information with the bar code quality manager program 100 and the bar code quality manager program 100 exchanges information with the bar code quality factors data base 300.

The bar code quality factors data base 300 contains a printer compatibility list 301; a printer settings list 302; a paper compatibility list 303; a toner and ink compatibility list 304; bar code definitions 305; a list of printer growth and shrinkage factors 306; a paper growth factors list 307; and a toner and ink growth factors list 308. Printer compatibility list 301 contains a list of printer manufacturers, model numbers and serial numbers that are known to work with this invention. It also contains a list of printers that do not work with this invention. Printer settings list 302 contains the user selectable settings for each known printer. Settings include hardware settings on the printer such as exposure, density or blackness or sharpness, etc. The printer software settings list 302 may include sharpness, density, background, etc. Paper compatibility list 303 contains a list of papers that function correctly with each printer contained in list 301 or 302. Toner and ink compatibility list 304 contains a list of toners and inks that function correctly with each paper contained in list 303 and for printer contained in list 301. Bar code definitions 305 contain a geometric definition of the bar codes. Printer growth and shrinkage factors list 306 includes a listing of actual growth that can be expected when printing a specific set of spots. Paper growth factors list 307 is a table of papers and printers that allows one to look up the incremental growth of a specific paper for a specific printer. Toner and ink growth factors list 308 is a table that contains the incremental growth incurred when a non-standard ink is substituted for the printers in list 306.

FIG. 12 is a drawing showing the interaction of printer 42 with the programs contained in computer 41. The PSD based mailer program exchanges information with PSD unit 40, modem 44 and bar code print quality manager program 100. The bar code quality manager program 100 exchanges information with the bar code quality factors data base 300 and the bar code print quality variable spot size software raster image processor driver 320. An example of a variable spot software raster image processor driver is the Canon laser printer driver manufactured by Canon. Driver 320 exchanges information with printer 42. Printer 42 contains either a raster image processor bypass port and has software that is compatible with a raster image processor driver. An example of a printer having a raster image processor port is the Hewlett Packard Laser Jet III manufactured by Hewlett Packard. An example of a printer having raster image processor compatible software that is also spot size printing capable is the Laser Master Unity Series Printers manufactured by Laser Master. For laser and LED printers the intensity of the beam or the exposure time may be varied in order to print various (pixel) spot sizes.

Figure 13:
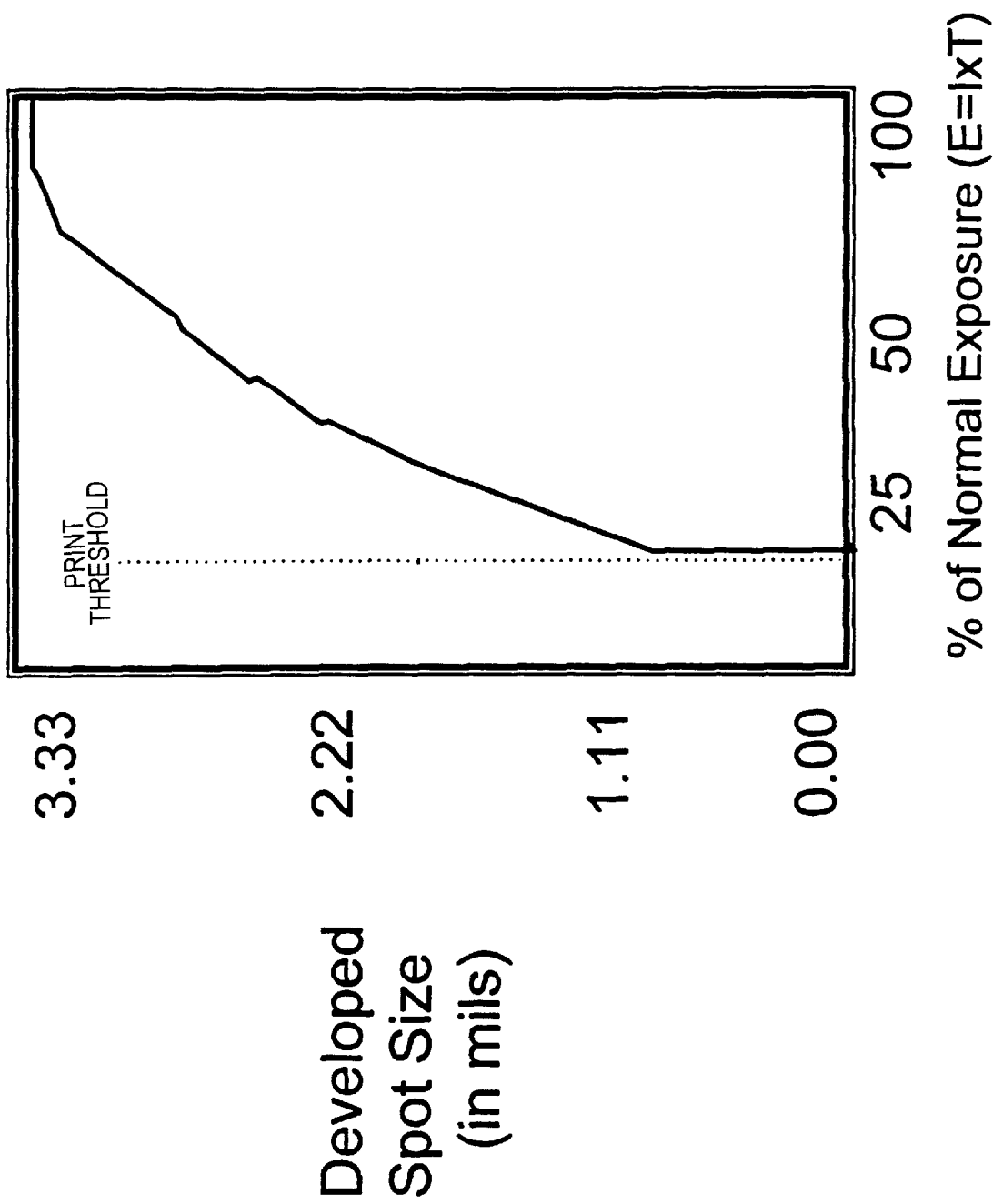
FIG. 13 is a graph of the developed spot size vs. percent of normal exposure for typical laser or LED printers.

In ink jet printing the stimulation voltage or pulse width may be varied in order to print various (pixel) spot sizes. FIG. 13 is a graph of the developed spot size vs. percent of normal exposure for typical laser or LED printers. This graph depicts the change in the laser or LED printers isolated spot size as a function of the printers exposure. Where, the exposure equals the intensity of the light times time. Below threshold a typical laser or LED printer will not print any spots.

Figure 14:
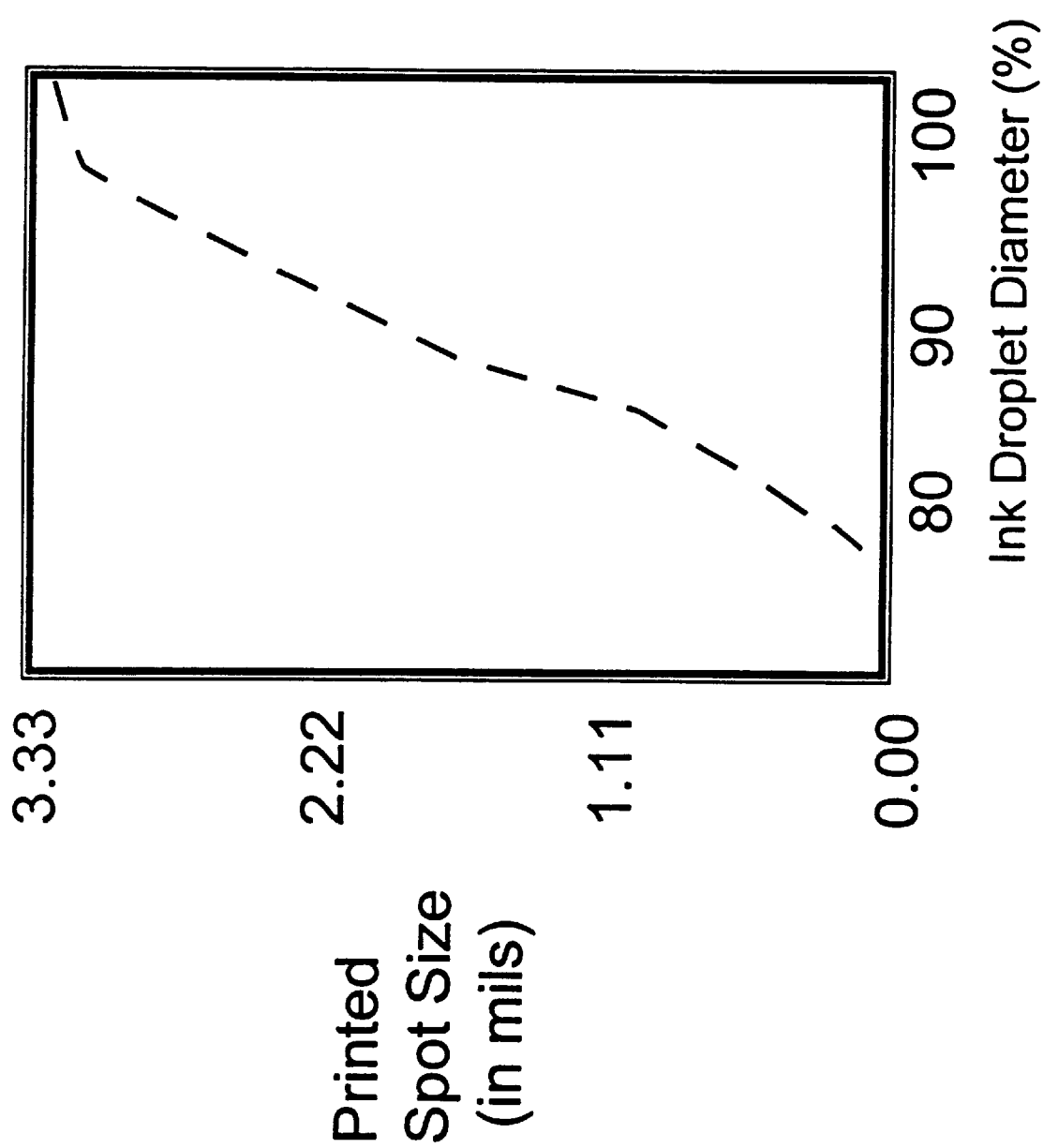
FIG. 14 is a graph of the printed spot size vs. ink droplet diameter for typical ink jet printers.

FIG. 14 is a graph of the printed spot size vs. ink droplet diameter for typical ink jet printers. This graph depicts the typical change in a printed isolated spot size as a function of the ink droplet diameter. It would be obvious to one skilled in the art that many different spot sizes may be used at the bars edges to make sure the bars have the correct width. This is done where the size on one bar edge is different from the size on the other bar edge to give a vernier effect to the correction. It will also be obvious that advancing or delaying the print position of the spots will produce bars of the correct width. The foregoing enables one to have the ability to correct for increased bar growth width.

The above specification describes a new and improved apparatus and method for removing fractions of a pixel from bar code bars to maintain the correct distance between adjacent correctly sized code forming bars. It is realized that the above description may indicate to those skilled in the art additional ways in which the principles of this invention may be used without departing from the spirit. It is, therefore, intended that this invention be limited only by the scope of the appended claims.

What is claimed is:

1. An apparatus for forming bars of a bar code, said apparatus comprising:

means for producing a plurality of different size spots on a medium;

means for controlling the location of said spots on said medium to produce bars;

means for supplying information regarding characteristics of said medium of the bars to be formed;

means for supplying information specifying the desired bar code characteristic; and means for using the medium characteristics information and bar code characteristics information to locate the different spot sizes at either edge of the bar so as to produce bars having the desired bar code width.

2. The apparatus claimed in claim 1, wherein the using means includes: means for varying light intensity to control the spot size.

3. The apparatus claimed in claim 1, wherein the using means includes: means for varying the exposure time to control the spot size.

4. The apparatus claimed in claim 1, wherein the using means includes: means for varying the stimulation voltage to control the spot size.

5. The apparatus claimed in claim 1, wherein the using means includes: means for varying the pulse width to control the spot size.

6. The apparatus claimed in claim 1, wherein the using means includes: means for delaying the printing position of the spot to pack more spots in the same area.

7. The apparatus claimed in claim 1, wherein the using means includes: means for advancing the printing position of the spot to pack more spots in the same area.

8. The apparatus claimed in claim 1, wherein the means for using controls spot sizes so as to produce bars having at least two parallel sides.

9. The apparatus claimed in claim 8, wherein the means for using controls spot sizes so as to produce bars having at least four parallel sides.

10. The apparatus claimed in claim 9, wherein the means for using controls spot sizes so as to produce bars having the correct length.

11. The apparatus claimed in claim 8, wherein the means for using controls spot sizes so as to produce bars having a plurality of smooth edges.

12. The apparatus claimed in claim 8, wherein the means for using maintains the correct distance between adjacent bars.

13. The apparatus claimed in claim 8, wherein the means for using makes the distance between adjacent bars constant.

14. A method for forming bars of a bar code, said method comprising the steps of:

producing different size spots on a medium;

controlling the location of said spots on said medium to produce bars;

supplying information of the bars to be formed; and using the supplied information and said property to control the spot sizes so as to produce bars having the desired bar width.

15. The method claimed in claim 14, wherein the using step controls spot sizes so as to produce bars having at least two parallel sides.

16. The method claimed in claim 14, wherein the using step controls spot sizes so as to produce bars having at least four parallel sides.

17. The method claimed in claim 14, wherein the using step controls spot sizes so as to produce bars having the correct length.

18. The method claimed in claim 14, wherein the using step controls spot sizes so as to produce bars having a plurality of parallel sides.

19. The method claimed in claim 14, wherein the using step maintains the correct distance between adjacent bars.

20. The method claimed in claim 14, wherein the using step makes the distance between adjacent bars constant.

* * * * *